US007072995B1

(12) United States Patent
Burroughs (10) Patent No.: US 7,072,995 B1
(45) Date of Patent: Jul. 4, 2006

(54) METHODS AND APPARATUS FOR INDICATING WHETHER A DEVICE IS CONNECTED TO A SERIAL ATA COMMUNICATIONS CABLE

(75) Inventor: John V. Burroughs, Mason, MA (US)

(73) Assignee: EMC Corporation, Hopkinton, MA (US)

( * ) Notice: Subject to any disclaimer, the term of this patent is extended or adjusted under 35 U.S.C. 154(b) by 168 days.

(21) Appl. No.: 10/742,668

(22) Filed: Dec. 19, 2003

(51) Int. Cl.
*G06F 13/00* (2006.01)

(52) U.S. Cl. .......................... 710/16; 710/32; 713/300; 713/310; 713/330; 713/340

(58) Field of Classification Search ................. 710/16, 710/32; 713/300, 310, 330, 340
See application file for complete search history.

(56) References Cited

U.S. PATENT DOCUMENTS

| 5,148,144 | A | 9/1992 | Sutterlin et al. ....... 340/310.01 |
| 5,991,885 | A | 11/1999 | Chang et al. ................ 713/300 |
| 5,994,998 | A | 11/1999 | Fisher et al. ........... 340/310.01 |
| 6,016,519 | A | 1/2000 | Chida et al. .................... 710/19 |
| 6,115,468 | A | 9/2000 | De Nicolo ................... 379/413 |
| 6,140,911 | A | 10/2000 | Fisher et al. ........... 340/310.01 |
| 6,175,556 | B1 | 1/2001 | Allen, Jr. et al. ........... 370/293 |
| 6,246,748 | B1 | 6/2001 | Yano .............................. 379/2 |
| 6,348,874 | B1 | 2/2002 | Cole et al. ............. 340/825.01 |
| 6,366,143 | B1 | 4/2002 | Liu et al. ..................... 327/142 |
| 6,393,050 | B1 | 5/2002 | Liu ............................. 375/219 |
| 6,496,103 | B1 | 12/2002 | Weiss et al. ........... 340/310.01 |
| 6,535,983 | B1 | 3/2003 | McCormack et al. ....... 713/310 |
| 6,701,443 | B1 | 3/2004 | Bell ............................ 713/300 |
| 6,762,675 | B1 * | 7/2004 | Cafiero et al. ........... 340/10.42 |
| 6,874,093 | B1 * | 3/2005 | Bell ............................ 713/300 |

FOREIGN PATENT DOCUMENTS

EP 0 777 357 A2 11/1996

OTHER PUBLICATIONS

Serial ATA: High Speed Serialized AT Attachment, Revision 1.0a, Jan. 7, 2003, APT Technologies, Inc., Dell Computer Corporation, Intel Corporation, Maxtor Corporation, Seagate Technology, pp. 1-310.
Serial ATA II: Extensions to Serial ATA 1.0a, Revision 1.1, Oct. 9, 2003, Dell Computer Corporation, Intel Corporation, Maxtor Corporation, Vitesse Semiconductor Corporation.

* cited by examiner

*Primary Examiner*—Tammara Peyton
(74) *Attorney, Agent, or Firm*—BainwoodHuang (57) ABSTRACT

A Serial ATA communications system has a host, a device, and a Serial ATA communications cable that connects the host to the device. The Serial ATA communications cable includes (i) a pair of transmit lines configured to carry a differential mode transmit signal, (ii) a pair of receive lines configured to carry a differential mode receive signal, and (iii) a set of ground lines. The host includes a transmit circuit configured to connect to the pair of transmit lines of the Serial ATA communications cable, a receive circuit configured to connect to the pair of receive lines of the Serial ATA communications cable, and a sensor. The sensor is configured to provide an output signal indicating whether a Serial ATA device is connected to the Serial ATA communications cable in response to a test signal applied to the set of ground lines.

20 Claims, 5 Drawing Sheets

METHODS AND APPARATUS FOR INDICATING WHETHER A DEVICE IS CONNECTED TO A SERIAL ATA COMMUNICATIONS CABLE

BACKGROUND

The Serial ATA interface specification defines a variety of requirements for serial communications between a host (e.g., a general purpose computer) and a device (e.g., a disk drive). When an equipment manufacture provides a product that complies with the Serial ATA interface specification, the equipment manufacturer knows that the product will be compatible with other complementary Serial ATA interface products (e.g., Serial ATA interface components provided by other equipment manufacturers).

To support Serial ATA communications, a power supply cable typically runs from a power supply (or power controller) of the host to the device to carry power supply and ground signals from the power supply to the device. Additionally, a separate Serial ATA communications cable typically runs from a controller or concentrator of the host (e.g., a host bus adapter, a RAID controller, etc.) to the device to carry information between the host and the device. Some equipment manufacturers leave the power supply cable and the Serial ATA communications cable separate by using a power supply connector (e.g., a legacy power supply connector) and a separate Serial ATA communications cable connector. Other equipment manufacturers combine the power supply cable and the Serial ATA communications cable into a single cable assembly by terminating both the power supply cable and the Serial ATA communications cable with a single integrated device connector which attaches to the device.

In general, the power supply cable includes four lines: a first power supply line for carrying a first voltage signal (e.g., 12 volts), a second power supply line for carrying a second voltage signal (e.g., 5 volts) and two ground lines. The ground lines provide return paths for the voltage signals. In some instances, more comprehensive power supply cables are used in order to provide additional voltage signals (e.g., 3.3 volts, 5 volts and 12 volts).

Similarly, the Serial ATA communications cable generally includes seven lines: two transmit lines (e.g., A+/A−) for carrying a differential mode transmit signal, two receive lines (e.g., B+/B−) for carrying a differential mode receive signal, and three ground lines. In both the host and the device, circuitry connected to one end of the Serial ATA communications cable converts information (e.g., bytes, words, etc.) into a serialized form for conveyance through the cable, and circuitry connected to the other end of the cable de-serializes the information back into parallel form for effective command, status and data transfer therebetween.

Further details of the Serial ATA interface specification are available in a document entitled "Serial ATA: High Speed Serialized AT Attachment", Revision 1.0a, Jan. 7, 2003, the teachings of which are hereby incorporated by reference in their entirety. Additional details of the Serial ATA interface specification are provided in a document entitled "Serial ATA II: Extensions to Serial ATA 1.0", Revision 1.0, Oct. 16, 2002, the teachings of which are hereby incorporated by reference in their entirety.

A conventional device presence detection mechanism for detecting whether a device is present is described in section 6.4.3 of the Serial ATA II document. This mechanism utilizes a precharge circuit and relies on the device busing together its power delivery contacts. As a result, there is either a small impedance between two points A and B on one power supply leg when no device is present, or no impedance across the two points A and B when the device is present.

SUMMARY

Unfortunately, there are deficiencies to the above-described Serial ATA interface specification. For example, the Serial ATA interface specification does not provide a convenient way for the host to distinguish between a first situation in which a device is absent and a second situation in which the device is present but malfunctioning. In either situation, the host may attempt to communicate with the device by sending a command to the device through the Serial ATA communications cable. If the host does not receive a response to the command, the host may incorrectly conclude that no device exists on the other end of the Serial ATA communications cable even though the device is present but malfunctioning.

Some equipment manufacturers may provide a separate third cable (in addition to the power cable and the Serial ATA communications cable) which is dedicated to carrying "out-of-band" communications between the host and the device. Unfortunately, such a third cable provides additional physical obstruction between the host and the device which is a hindrance, e.g., hinders air flow, makes it more difficult to work in the space between the host and the device, increases material and assembly costs, etc.

Furthermore, in connection with the above-mentioned conventional device presence detection mechanism for detecting whether a device is present which is described in section 6.4.3 of the Serial ATA II document, the mechanism depends on detecting a small amount of current difference through two points A and B on a power supply leg. Unfortunately, this mechanism assumes that both a faulty device and a non-faulty will draw similar amounts of power thus making the mechanism a somewhat clumsy approach to device presence detection.

Embodiments of the present invention are directed to techniques for indicating whether a device is connected to a Serial ATA communications cable. In particular, an output signal indicates whether a device is connected to the Serial ATA communications cable in response to a test signal applied to a set of ground lines of that cable. A host receiving the output signal is thus capable of more robust operation. For example, if the output signal indicates that a device is present but, concurrently, the host does not receive an expected response from the device, the host then knows that the device has malfunctioned and that the device has not been removed such as during a hot swapping operation. Accordingly, the host can take appropriate action such as outputting an error signal to identify the situation to a technician, placing a call to a field service support office, performing a data recovery operation or more extensive testing, etc.

One embodiment of the invention is directed to a Serial ATA communications system having a host (e.g., a storage processor), a device (e.g., a disk drive), and a Serial ATA communications cable that connects the host to the device. The Serial ATA communications cable includes (i) a pair of transmit lines configured to carry a differential mode transmit signal, (ii) a pair of receive lines configured to carry a differential mode receive signal, and (iii) a set of ground lines. The host includes (among other things) a transmit circuit configured to connect to the pair of transmit lines of the Serial ATA communications cable, a receive circuit configured to connect to the pair of receive lines of the Serial ATA communications cable, and a sensor. The sensor is configured to provide an output signal indicating whether a Serial ATA device is connected to the Serial ATA communications cable in response to a test signal applied to the set of ground lines. The output signal allows the host to distinguish between a situation in which the device is absent (e.g., during a hot swapping operation), or a situation in which the device has malfunctioned thus requiring performance of a procedure for fault tolerance.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for indicating whether a device (e.g., a disk drive) is connected to a Serial ATA communications cable. In particular, an output signal indicates whether the device is connected to the cable in response to a test signal applied to a set of ground lines of the cable. A host (e.g., a storage processor) receiving the output signal is thus capable of more robust operation. For instance, if the output signal indicates that the device is present but the host does not receive an expected response from the device, the host then knows that the device has not been removed and that the device has malfunctioned, i.e., the host knows that there is not currently a device hot swapping operation taking place but that something has gone wrong with the device. As a result, the host can take appropriate action such as outputting a notification signal to identify the situation to a technician, placing a call to a field service support office, performing a data recovery operation or more extensive testing, and the like.

Figure 1:
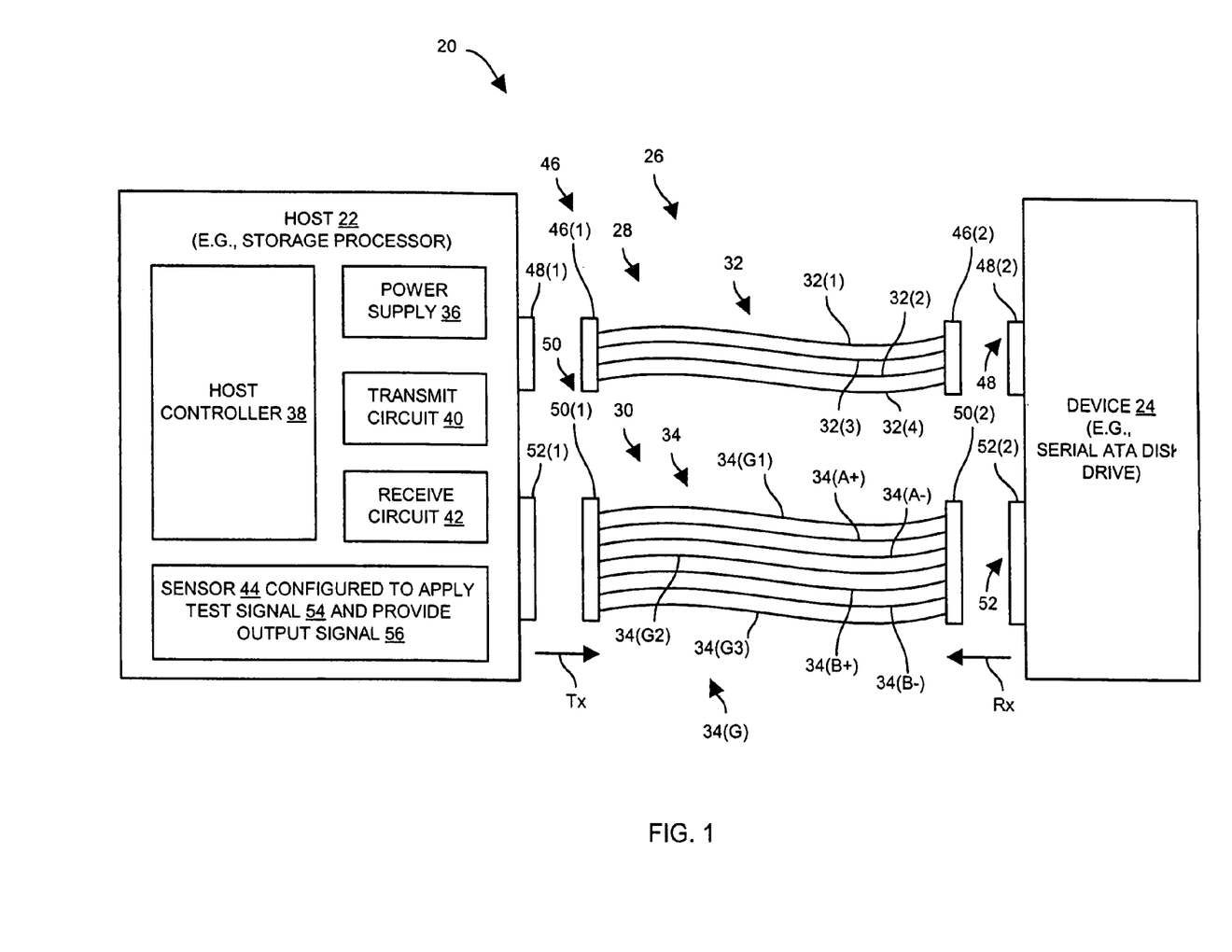
FIG. 1 is a block diagram of a Serial ATA communications system which is suitable for use by the invention.

FIG. 1 shows a Serial ATA communications system 20 which is suitable for use by the invention. The Serial ATA communications system 20 includes a host 22, a device 24 and a set of cables 26 which connects the host 22 with the device 24. The set of cables 26 includes a power cable 28 and a Serial ATA communications cable 30.

As shown in FIG. 1, the power cable 28 includes four power cable lines 32, namely, a first power supply line 32(1) for carrying a first voltage signal (e.g., 12 volts), a second power supply line 32(2) for carrying a second voltage signal (e.g., 5 volts) and two ground lines 32(3), 32(4). The ground lines 32(3), 32(4) provide return paths for the voltage signals.

As further shown in FIG. 1, the Serial ATA communications cable 30 includes seven lines 34, namely, two transmit lines 34(A+), 34(A−) for carrying a differential mode transmit signal Tx, two receive lines 34(B+), 34(B−) for carrying a differential mode receive signal Rx, and three general ground line 34(G1), 34(G2), 34(G3) (collectively, ground lines 34(G)).

The host 22 includes a power supply 36, a host controller 38, a transmit circuit 40, a receive circuit 42, and a sensor 44. The power supply 36 is configured to provide power directly to circuitry within the host 22. The power supply 36 is also configured to provide power (e.g., pre-charging, ongoing power, backup power, etc.) remotely to circuitry within the device 24 through the power cable 28.

The host controller 38 is configured to perform normal operations in a normal operating mode. In one arrangement, the Serial ATA communications system 20 is a data storage system, the host controller 44 is a storage processor, and the device 24 is a storage unit (e.g., a Serial ATA disk drive, a diskette drive, a tape drive, a CDROM drive, etc.). In this arrangement, the host controller 38 is configured to perform a robust set of data storage operations (e.g., LOAD and STORE operations, etc.) on behalf of one or more external hosts while operating in the normal operating mode.

To assemble the system 20, a user connects power connectors 46 of the power cable 28 to the host 22 and to the device 24. In particular, the user connects a first power connector 46(1) of the power cable 28 to a corresponding power connector 48(1) of the host 22 and a second power connector 46(2) of the power cable 28 to a corresponding power connector 48(2) of the device 24. Additionally, the user connects Serial ATA communications connectors 50 of the Serial ATA communications cable 30 to the host 22 and to the device 24. To this end, the user connects a first Serial ATA connector 50(1) of the Serial ATA communications cable 30 to a corresponding Serial ATA connector 52(1) of the host 22 and a second Serial ATA connector 50(2) of the Serial ATA communications cable 30 to a corresponding Serial ATA connector 52(2) of the device 24.

Under direction of the host controller 44, the transmit circuit 40 is configured to transmit commands and data to the device 24 in serialized form. In particular, once the system 20 has been assembled, the transmit circuit 40 sends the differential mode transmit signal Tx to the device 24 through the two transmit lines 34(A+), 34(A−) of the Serial ATA communications cable 30.

Similarly, the receive circuit 42 is configured to receive status and data from the device 24 in serialized form and then pass that information onto the host controller 38. To this end, the receive circuit 42 obtains the differential mode receive signal Rx from the device 24 through the two receive lines 34(B+), 34(B−) of the Serial ATA communications cable 30.

The sensor 44 is configured to indicate whether the device 24 is present. That is, there may be situations in which the device 24 is absent such as during a device hot swapping procedure, and the sensor 44 determines whether the device 24 is present by sensing through the Serial ATA communications cable 30. To this end, when the cables 28, 30 are connected to the host 22, the sensor 44 applies a test signal 54 to the ground lines 34(G) of the Serial ATA communications cable 30, and provides an output signal 56 indicating whether the device 24 is connected to the Serial ATA communications cable 30 in response to the applied test signal 54. Circuitry such as the host controller 38 is then able to use the output signal 56 for more robust operation (e.g., to distinguish between when the device 24 has failed and when the device 24 has simply been removed).

It should be understood that the Serial ATA communications system 20 does not require a separate third cable (in addition to the power cable 28 and the Serial ATA communications cable 30) to determine whether the device 24 is present. Rather, the sensor 44 of the host 22 utilizes the Serial ATA communications cable 30 thus alleviating the need for a third cable (or any additional lines) and the associated drawbacks (e.g., further air flow obstruction, increased costs, etc.). Further details of the invention will now be provided with reference to FIG. 2.

Figure 2:
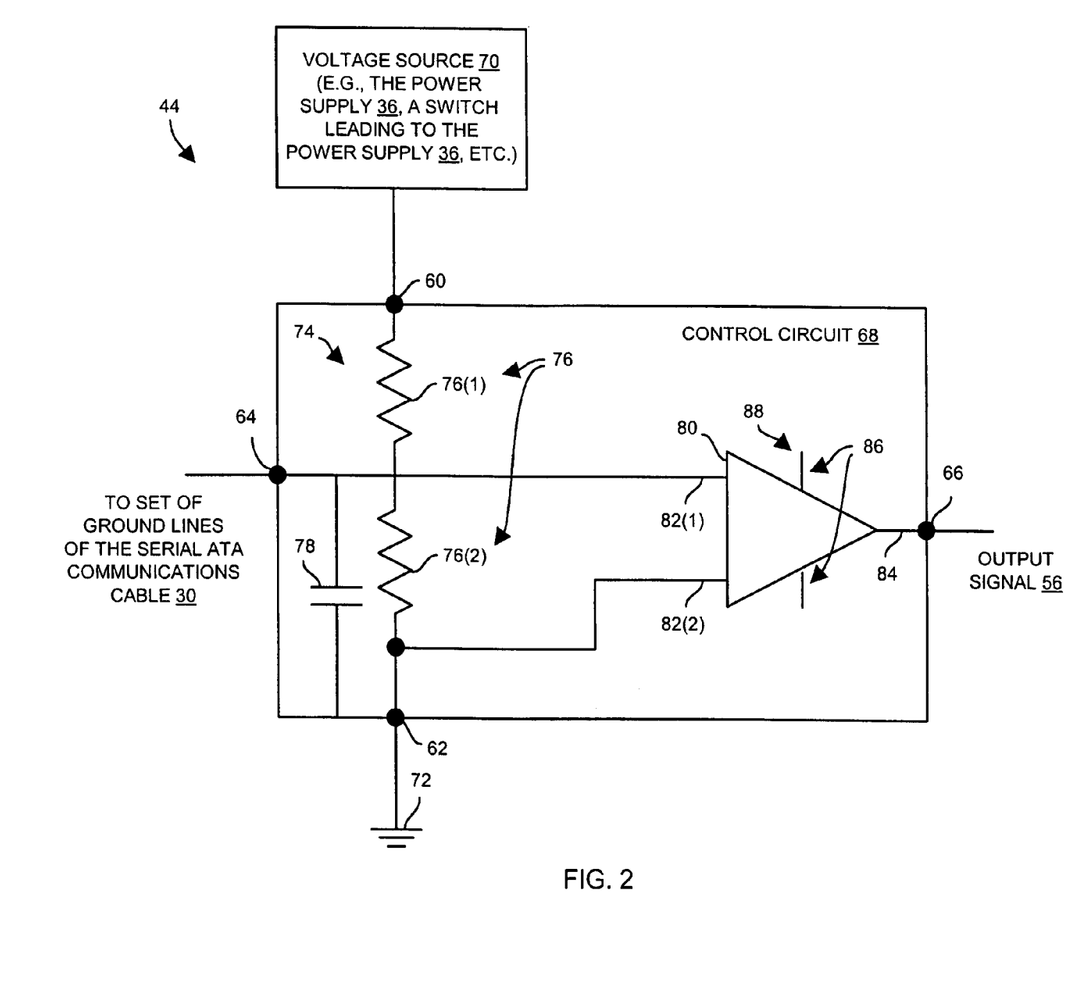
FIG. 2 is a block diagram of a sensor which is configured to connect to a Serial ATA communications cable of the Serial ATA communications system of FIG. 1.

FIG. 2 is a block diagram of the sensor 44 of the host 22. The sensor 44 includes a power terminal 60, a ground terminal 62, a cable terminal 64, an output terminal 66, and a control circuit 68. The control circuit 68 is interconnected between each of the terminals 60, 62, 64, 66. The power terminal 60 connects to a voltage source 70 (e.g., 12 VDC, 5 VDC, 3.3 VDC, etc.) of the host 22 (e.g., a power supply terminal of the power supply 36). The ground terminal 62 connects to a ground reference 72 (e.g., a ground terminal of the power supply 36). The cable terminal 64 connects to the Serial ATA connector 52(1) of the host 22, and ultimately to the set of ground lines 34(G) of the Serial ATA communications cable 30 when the Serial ATA connector 50(1) of the Serial ATA communications cable 30 connects with the Serial ATA connector 52(1) of the host 22 (also see FIG. 1). The output terminal 66 leads to other circuitry (e.g., the host controller 38, a warning display or LED, etc.).

As shown in FIG. 2, the control circuit 68 includes a voltage divider 74 formed by two resistors 76(1), 76(2) (collectively, resistors 76), a capacitor 78, and a compare circuit 80. The resistor 76(1) is interconnected between the power terminal 60 and the cable terminal 64. The resistor 76(2) is interconnected between the cable terminal 64 and the ground terminal 62. The capacitor 78 is also interconnected between the cable terminal 64 and the ground terminal 62. The compare circuit 80 includes a first input 82(1) connected to the cable terminal 64, a second input 82(2) connected to the ground terminal 62, and an output 84 connected to the output terminal 66. The compare circuit 80 further includes threshold lines 86 which receives a threshold voltage 88 (e.g., from the power supply 36) having a predetermined value (e.g., 2.5 VDC) for comparison purposes.

It should be understood that, in some off-the-shelf Serial ATA communications cables, the ground lines are connected to each other. Nevertheless, the cable terminal 64 is also configured to connect all of the ground lines 34(G) of the Serial ATA communications cable 30 together as well.

When the cables 28, 30 are connected to the host 22 and the host 22 is in operation, the capacitor 78 is configured to provide AC grounding of the set of ground lines 34(G) of the Serial ATA communications cable 30 to the ground reference 72. Furthermore, the control circuit 68 of the sensor 44 is configured to apply the test signal 54 (through the cable terminal 64) to the set of ground lines 34(G) of the Serial ATA communications cable 30 and sample a response. The control circuit 68 is further configured to output the output signal 56 through the output terminal 62. In particular, the control circuit 64 outputs, as the output signal 56, (i) a first voltage level (e.g., a logical "0") when the cable terminal 64 connects to the device 24 through the Serial ATA communications cable 30, and (ii) a second voltage level (e.g., a logical "1") that is different than the first voltage level when the cable terminal 64 does not connect to the device 24 through the Serial ATA communications cable 30. Further details of the sensor 44 will now be provided with reference to FIGS. 3–4.

Figure 3:
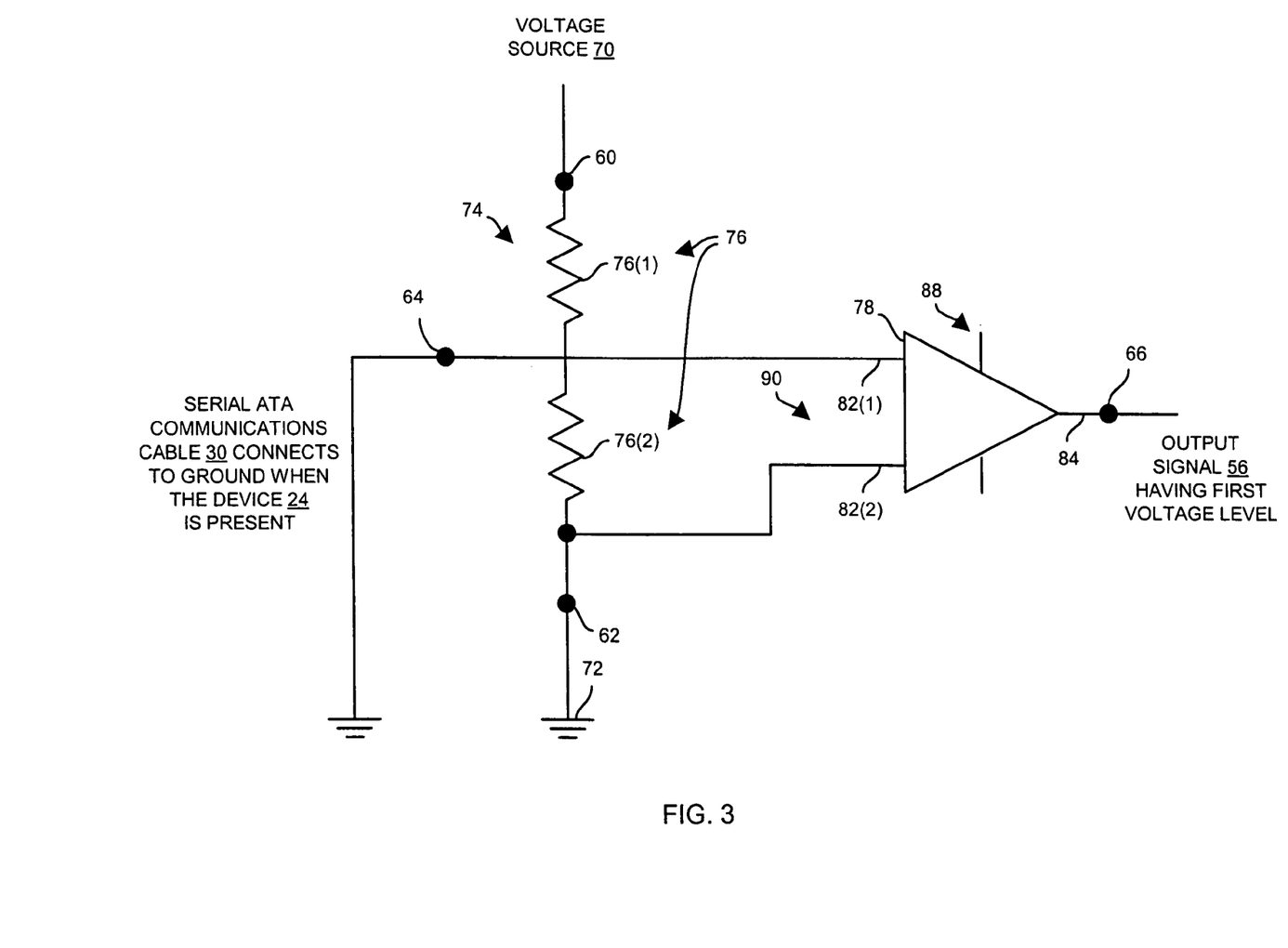
FIG. 3 is a schematic diagram of a portion of the Serial ATA communications system when a device is present at an end of the Serial ATA communications cable.

FIG. 3 is a schematic diagram of the sensor 44 when the device 24 is present at the end of the Serial ATA communications cable 30, i.e., when the Serial ATA connector 46(2) of the cable 30 is connected with the Serial ATA connector 48(2) of the device 24 (also see FIG. 1). In this situation, the device 24 grounds the set of ground lines 34(G) by virtue of device's connection with the power cable 28 back to the host 22. Preferably, the values of the resistors 76 are very high to limit current passing through the voltage divider 74 as well as to cause a substantially zero volt input to occur on the cable terminal 64 when the device 24 connects to the host 22 through the Serial ATA communications cable 30. That is, the potential difference 90 between the cable terminal 64 and the ground terminal 62 is substantially zero volts. The compare circuit 80 compares the potential difference 90 on the inputs 82(1), 82(2) (e.g., zero VDC) to the threshold voltage 88 (e.g., 2.5 VDC), and outputs the output signal 56 having the first voltage level (e.g., logical "0") indicating that the device 24 is present.

Figure 4:
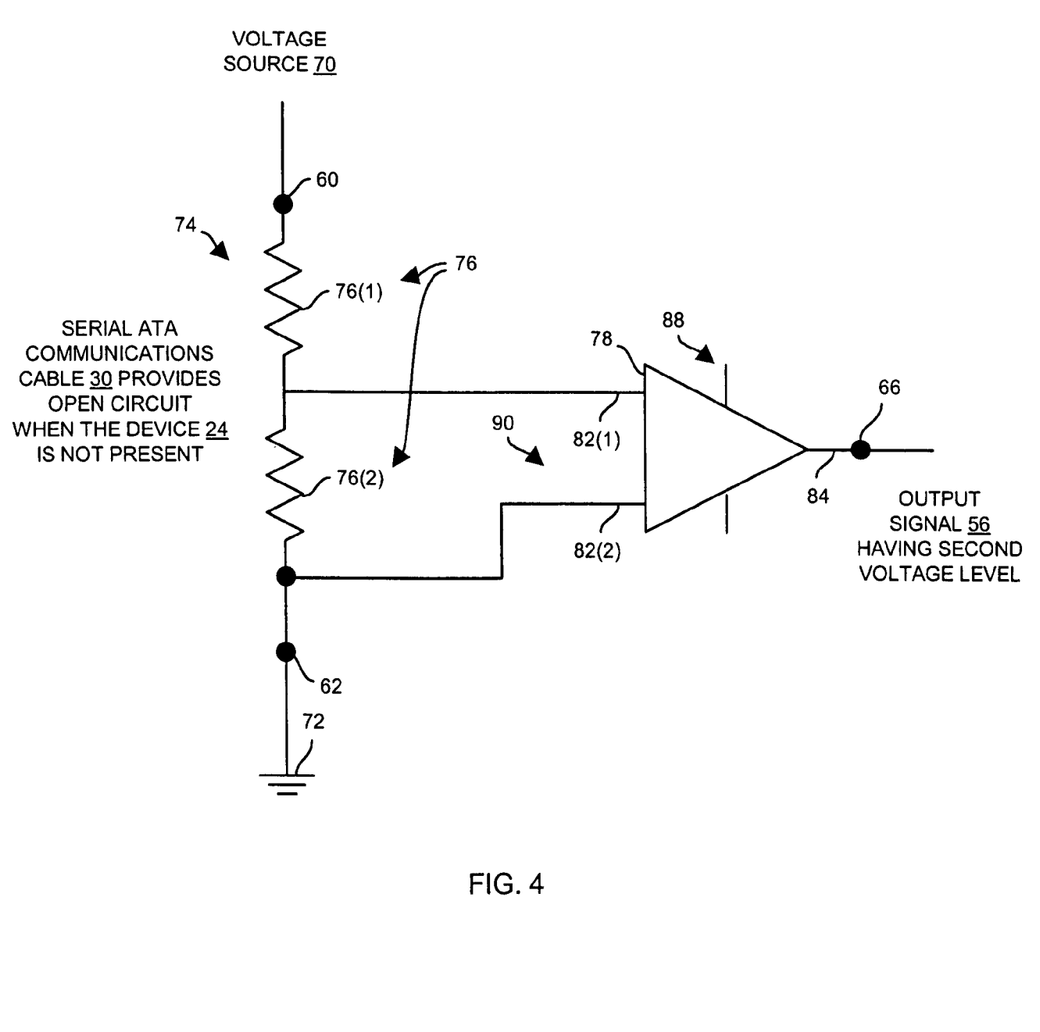
FIG. 4 is a schematic diagram of the portion of the Serial ATA communications system when a device is not present at the end of the Serial ATA communications cable.

In contrast, FIG. 4 is a schematic diagram of the sensor 44 when the device 24 is not present at the end of the Serial ATA communications cable 30, i.e., when the Serial ATA connector 46(2) of the cable 30 is disconnected from the Serial ATA connector 48(2) of the device 24 (also see FIG. 1). In this situation, although the voltage divider 74 reduces the voltage from the voltage source 70, but the potential difference 90 between the cable terminal 64 and the ground reference 72 is substantially not zero. Rather, based on the values of the resistors 76 and the voltage source 70 and since the Serial ATA communications cable 30 is an open circuit, the potential difference 90 is substantially greater than the threshold voltage 88. Accordingly, when the compare circuit 80 compares this potential difference 90 (e.g., 12 VDC, 5 VDC, 3.3 VDC, etc.) to the threshold voltage 88, the resulting output signal 56 has the second voltage level (e.g., logical "1") indicating that the device 24 is not present.

The host 22 is then capable of using the output signal 56 to determine a suitable course of action. For example, suppose that the host controller 22 has sent a command to the device 24 but has not yet received a response from the device 24 even though a timeout period has elapsed. If the output signal 56 indicates that the device 24 is not present, the host controller 22 may conclude that the device 24 has been removed (e.g., that a technician is performing a hot swapping operation, that the cable 30 has inadvertently become disconnected, etc.), and take minimal action (e.g., remain in normal operating mode and activate a warning light indicating that the device 24 is absent, make an entry into a log file stored in memory of the host controller 22, etc.). However, if the output signal 56 indicates that the device 24 is present, the host controller 22 may conclude that the device 24 has somehow failed and take more significant action (e.g., activate an error light indicating that an error has occurred, provide a notification to a remote service center in an automated manner thus requesting servicing by a technician, transition from normal operating mode to an error handling mode and perform a data recovery routine, etc.).

It should be understood that the sensor 44 is capable of operating either in a continuous manner or a periodic manner. In particular, in one arrangement, the voltage source 70 provides a voltage signal continuously to the voltage divider 74 of the sensor 44 causing continuous application of the test signal 54 to the set of ground lines 34(G). In this arrangement, the voltage source 70 is essentially the power supply 36 (e.g., perhaps with additional current or voltage limiting circuitry for safety but without the need for any additional control circuitry). As a result, the compare circuit 80 outputs the output signal 56 onto the output terminal 66 in an ongoing manner.

In an alternative arrangement, the voltage source 70 provides the voltage signal periodically to the voltage divider 74 of the sensor 44 causing periodic application of the test signal 54 to the set of ground lines 34(G). In this arrangement, the voltage source 70 is essentially a switch that toggles periodically (e.g., under control of the host controller 38, also see FIG. 1) to control access to the power supply 36 as well as to limit application of the test signal 54 to the Serial ATA communications cable 30. Accordingly, the compare circuit 80 outputs the output signal 56 onto the output terminal 66 in an intermittent manner.

It should be understood that the Serial ATA communications system 20 does not significantly impose on the power supply characteristics of the system 20 (i.e., the power cable 28, the power drawing attributes of the device 24, etc.) as in a conventional device presence detection mechanism for detecting whether a device is present as described in section 6.4.3 of the Serial ATA II document. That is, in contrast to that conventional device presence detection mechanism which detects a small amount of current difference through two points A and B on a power supply leg and which assumes that both a faulty device and a non-faulty will draw similar amounts of power, embodiments of the present invention utilizes grounds lines 34(G) not power lines. That is, in the system 20, an easily detectable level of voltage potential difference 90 is compared to the threshold voltage 88 without the need for a restrictive and difficult analogy circuit as described in section 6.4.3 of the Serial ATA II document. Accordingly, the techniques of the system 20 can be implemented in a less expensive manner, are more reliable, and are less cumbersome. Further details of the invention will now be provided with reference to FIG. 5.

Figure 5:
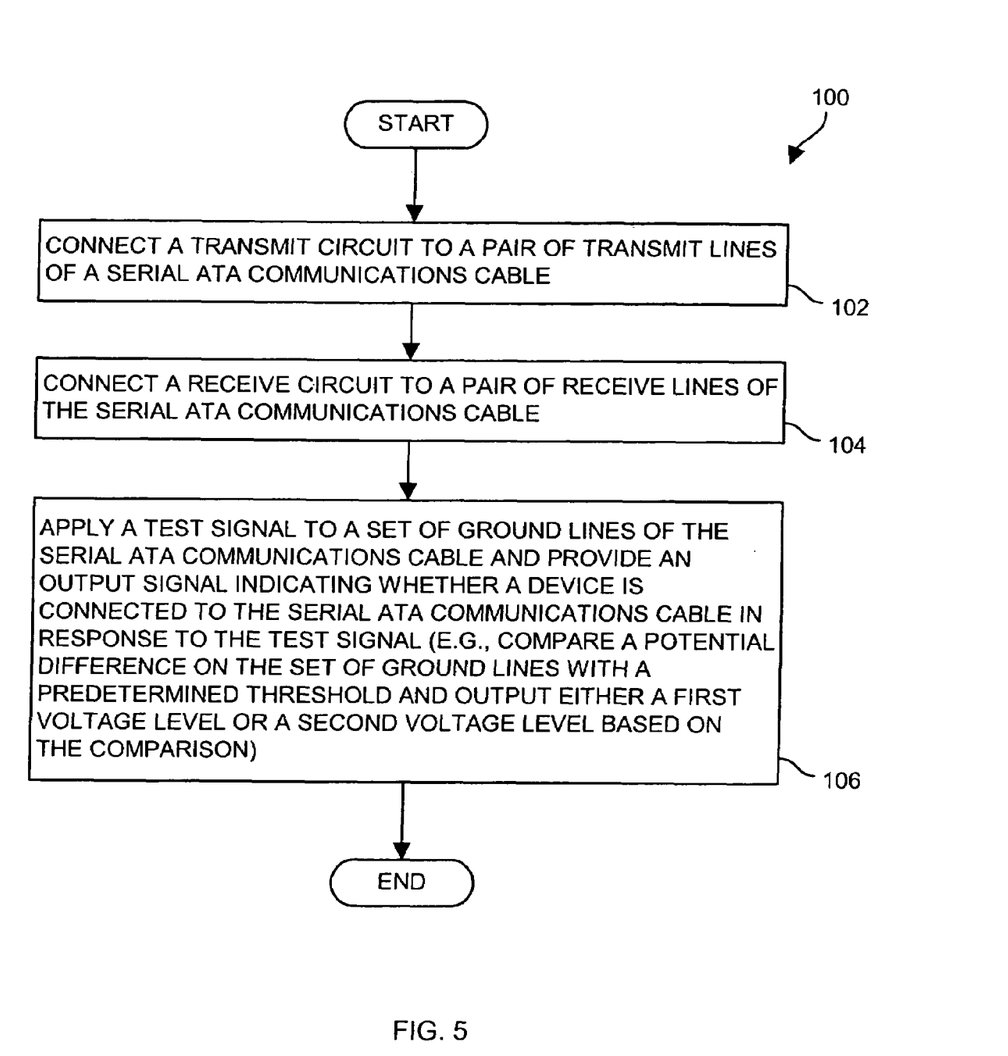
FIG. 5 is a flowchart of a procedure which is performed by a user of the Serial ATA communications system of FIG. 1.

FIG. 5 is a flowchart of a procedure 100 which is performed by a user of the Serial ATA communications system 20. In step 102, the user connects the transmit circuit 40 to the pair of transmit lines 34(A+), 34(A−) of the Serial ATA communications cable 30. In step 104, the user connects the receive circuit 42 to the pair of receive lines 34(B+), 34(B−) of the Serial ATA communications cable 30. Although there is no requirement that the lines 34 be simultaneously connectable to the host 22, steps 102 and 104 preferably occur concurrently when the user connects the connector 50(1) of the Serial ATA communications cable 30 with the corresponding Serial ATA connector 52(1) of the host 22 for convenience and to simplify operation of the sensor 44. As a result, the cable terminal 64 of the sensor 44 now connects to the ground lines 34(G) of the Serial ATA communications cable 30 (also, see FIG. 1).

In step 106, the sensor 44 applies the test signal 54 to the ground lines 34(G), and outputs the output signal 56 which indicates whether the device 24 is connected to the opposite end of the Serial ATA communications cable 30. In particular, the compare circuit 80 of the sensor 44 (also, see FIGS. 2–4) compares the potential difference 80 between the cable terminal 64 and the ground terminal 62 with a predetermined threshold 88 to determine whether to output, as the output signal 56, a first voltage level (e.g., a logical "0") or a second voltage level (e.g., a logical "1"). The output signal 56 enables circuitry to then select an appropriate course of action.

As mentioned above, embodiments of the invention are directed to techniques for indicating whether a device 24 (e.g., a disk drive) is connected to a Serial ATA communications cable 30. In particular, an output signal 56 indicates whether the device 24 is connected to the cable 30 in response to a test signal 54 applied to a set of ground lines 34(G) of the cable 30. A host 22 (e.g., a storage processor) receiving the output signal 56 is thus capable of more robust operation. For instance, if the output signal 56 indicates that the device 24 is present but the host 22 does not receive an expected response from the device 24, the host 22 then knows that the device 24 has not been removed and that the device 24 has malfunctioned. As a result, the host 22 can take appropriate action such as outputting a notification signal to identify the situation to a technician, placing a call to a field service support office, performing a data recovery operation or more extensive testing, and the like.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the sensor 44 was described above as having a compare circuit 80 which tests a potential difference 90 across a lower half of a voltage divider 74, i.e., across the resistor 76(2), by way of example only. Other arrangements are suitable for use by the invention as well such as current sensing through the resistor 76(1), testing a potential difference across the top half of the voltage divider 74, etc. In particular, in some arrangements, the resistor 76(1) is positioned as shown in FIG. 2 to limit any current draw by the sensor 44, but the resistor 76(2) is omitted in order to allow for more margin between a first situation in which the device 24 is present and a second situation in which the device 24 is not present.

Additionally, it should be understood that embodiments of the invention were described above as being applicable to the Serial ATA interface by way of example only. In accordance with certain other embodiments of the invention, there is down-stream device detection of non-Serial ATA interface components. In these other arrangements, sensing of such non-Serial ATA interface components is achievable by utilizing the grounds that are always available in copper cabling. There is typically no issue of how the two sides of the cabling obtain an actual ground reference since there are other ground sources available (e.g., an AC ground on a power supply if there is no other lower impedance ground). Such modifications and enhancements are intended to be within the scope of various embodiments of the invention.

What is claimed is:

1. A Serial ATA communications system, comprising:
   a device;
   a Serial ATA communications cable configured to connect to the device, the Serial ATA communications cable having (i) a pair of transmit lines configured to carry a differential mode transmit signal, (ii) a pair of receive lines configured to carry a differential mode receive signal, and (iii) a set of ground lines; and
   a host which includes:
      a transmit circuit configured to connect to the pair of transmit lines of the Serial ATA communications cable,
      a receive circuit configured to connect to the pair of receive lines of the Serial ATA communications cable, and a sensor configured to provide an output signal indicating whether a Serial ATA device is connected to the Serial ATA communications cable in response to a test signal applied to the set of around lines when the transmit circuit connects to the pair of transmit lines and the receive circuit connects to the pair of receive lines;

wherein the sensor of the host includes:
a cable terminal configured to connect to the set of ground lines of the Serial ATA communications cable;
an output terminal; and
a control circuit interconnected between the cable terminal and the output terminal, the control circuit being configured to output, as the output signal on the output terminal, (i) a first voltage level when the cable terminal connects to the device through the Serial ATA communications cable, and (ii) a second voltage level that is different than the first voltage level when the cable terminal does not connect to the device through the Serial ATA communications cable.

2. The Serial ATA communications system of claim 1 wherein the control circuit of the sensor includes:
a first resistor circuit interconnected between a voltage source and the cable terminal;
a second resistor circuit interconnected between the cable terminal and a reference; and
a compare circuit having a first input connected to the cable terminal, a second input connected to the reference, and an output connected to the output terminal.

3. The Serial ATA communications system of claim 2 wherein the compare circuit of the control circuit is configured to output the output signal onto the output terminal, and wherein the voltage source is configured to cause continuous application of the test signal to the set of ground lines so that the compare circuit outputs the output signal onto the output terminal in an ongoing manner.

4. The Serial ATA communications system of claim 2 wherein the compare circuit of the control circuit is configured to output the output signal onto the output terminal, and wherein the voltage source is configured to cause periodic application of the test signal to the set of ground lines so that the compare circuit outputs the output signal onto the output terminal in an intermittent manner.

5. The Serial ATA communications system of claim 2 wherein the Serial ATA communications cable includes, as the set of ground lines, (i) a first ground shield associated with the pair of transmit lines, (ii) a second ground shield associated with the pair of receive lines, and (iii) a general ground line; and wherein the cable terminal is configured to interconnect the first ground shield, the second ground shield and the general ground line together.

6. The Serial ATA communications system of claim 5 wherein the control circuit further includes:
capacitance between the cable terminal and the reference to provide AC grounding for the first ground shield, the second ground shield and the general ground line.

7. The Serial ATA communications system of claim 1 wherein the host includes a power supply and a Serial ATA host controller circuitry to operate as a storage processor of a data storage system, wherein the device includes a Serial ATA disk drive to operate as a storage unit of the data storage system, and wherein the system further comprises:
a power cable having (i) a set of power supply voltage lines configured to convey a set of power supply voltage signals between the power supply of the host and the disk drive of the device, and (ii) a set of power supply ground lines configured to convey a set of power supply ground signals between the power supply of the host and the disk drive of the device, the power cable being separate from the Serial ATA communications cable.

8. A Serial ATA communications system, comprising:
a device;
a Serial ATA communications cable configured to connect to the device, the Serial ATA communications cable having (i) a pair of transmit lines configured to carry a differential mode transmit signal, (ii) a pair of receive lines configured to carry a differential mode receive signal, and (iii) a set of ground lines; and
a host which includes:
a transmit circuit configured to connect to the pair of transmit lines of the Serial ATA communications cable,
a receive circuit configured to connect to the pair of receive lines of the Serial ATA communications cable, and
means for providing an output signal indicating whether a Serial ATA device is connected to the Serial ATA communications cable in response to a test signal applied to the set of ground lines when the transmit circuit connects to the pair of transmit lines and the receive circuit connects to the pair of receive lines;
wherein the means for providing of the host includes:
a cable terminal configured to connect to the set of ground lines of the Serial ATA communications cable,
an output terminal, and
a control circuit interconnected between the cable terminal and the output terminal, the control circuit being configured to output, as the output signal on the output terminal, (i) a first voltage level when the cable terminal connects to the device through the Serial ATA communications cable, and (ii) a second voltage level that is different than the first voltage level when the cable terminal does not connect to the device through the Serial ATA communications cable.

9. A host for exchanging Serial ATA communications with a device through a Serial ATA communications cable having (i) a pair of transmit lines configured to carry a differential mode transmit signal, (ii) a pair of receive lines configured to carry a differential mode receive signal, and (iii) a set of ground lines, the host comprising:
a transmit circuit configured to connect to the pair of transmit lines of the Serial ATA communications cable;
a receive circuit configured to connect to the pair of receive lines of the Serial ATA communications cable; and
a sensor configured to provide an output signal indicating whether a device is connected to the Serial ATA communications cable in response to a test signal applied to the set of ground lines when the transmit circuit connects to the pair of transmit lines and the receive circuit connects to the pair of receive lines;
wherein the sensor includes:
a cable terminal configured to connect to the set of ground lines of the Serial ATA communications cable;
an output terminal; and
a control circuit interconnected between the cable terminal and the output terminal, the control circuit being configured to output, as the output signal on the output terminal, (i) a first voltage level when the cable terminal connects to the device through the Serial ATA communications cable, and (ii) a second voltage level that is different than the first voltage level when the cable terminal does not connect to the device through the Serial ATA communications cable.

10. The host of claim 9 wherein the control circuit includes:
a first resistor circuit interconnected between a voltage source and the cable terminal;
a second resistor circuit interconnected between the cable terminal and a reference; and
a compare circuit having a first input connected to the cable terminal, a second input connected to the reference, and an output connected to the output terminal.

11. The host of claim 10 wherein the compare circuit is configured to output the output signal onto the output terminal, and wherein the voltage source is configured to cause continuous application of the test signal to the set of ground lines so that the compare circuit outputs the output signal onto the output terminal in an ongoing manner.

12. The host of claim 10 wherein the compare circuit is configured to output the output signal onto the output terminal, and wherein the voltage source is configured to cause periodic application of the test signal to the set of ground lines so that the compare circuit outputs the output signal onto the output terminal in an intermittent manner.

13. The host of claim 10 wherein the Serial ATA communications cable includes, as the set of ground lines, (i) a first ground shield associated with the pair of transmit lines, (ii) a second ground shield associated with the pair of receive lines, and (iii) a general ground line; and wherein the cable terminal is configured to interconnect the first ground shield, the second ground shield and the general ground line together.

14. The host of claim 13 wherein the control circuit further includes: capacitance between the cable terminal and the reference to provide AC grounding for the first ground shield, the second ground shield and the general ground line.

15. A host for exchanging Serial ATA communications with a device through a Serial ATA communications cable having (i) a pair of transmit lines configured to carry a differential mode transmit signal, (ii) a pair of receive lines configured to carry a differential mode receive signal, and (iii) a set of ground lines, the host comprising:
a transmit circuit configured to connect to the pair of transmit lines of the Serial ATA communications cable;
a receive circuit configured to connect to the pair of receive lines of the Serial ATA communications cable; and
means for providing an output signal indicating whether a device is connected to the Serial ATA communications cable in response to a test signal applied to the set of ground lines when the transmit circuit connects to the pair of transmit lines and the receive circuit connects to the pair of receive lines;
wherein the means for providing includes:
a cable terminal configured to connect to the set of ground lines of the Serial ATA communications cable,
an output terminal, and
a control circuit interconnected between the cable terminal and the output terminal, the control circuit being configured to output, as the output signal on the output terminal, (i) a first voltage level when the cable terminal connects to the device through the Serial ATA communications cable, and (ii) a second voltage level that is different than the first voltage level when the cable terminal does not connect to the device through the Serial ATA communications cable.

16. A method for indicating whether a device is connected to a Serial ATA communications cable having (i) a pair of transmit lines configured to carry a differential mode transmit signal, (ii) a pair of receive lines configured to carry a differential mode receive signal, and (iii) a set of ground lines, the method comprising:
connecting a transmit circuit to the pair of transmit lines of the Serial ATA communications cable;
connecting a receive circuit to the pair of receive lines of the Serial ATA communications cable; and
when the transmit circuit connects to the pair of transmit lines and the receive circuit connects to the pair of receive lines, providing an output signal indicating whether a device is connected to the Serial ATA communications cable in response to a test signal applied to the set of ground lines;
wherein a sensor includes a cable terminal configured to connect to the set of ground lines of the Serial ATA communications cable, an output terminal, and a control circuit interconnected between the cable terminal and the output terminal; and
wherein providing the output signal includes outputting, as the output signal on the output terminal, (i) a first voltage level when the cable terminal connects to the device through the Serial ATA communications cable, and (ii) a second voltage level that is different than the first voltage level when the cable terminal does not connect to the device through the Serial ATA communications cable.

17. The method of claim 16, further comprising:
applying the test signal to the set of ground lines to provide a potential difference between the set of ground lines and a reference, the potential difference having a first value when the Serial ATA communications cable connects to the device, and a second value when the Serial ATA communications cable does not connect to the device, the second value being different than the first value.

18. The method of claim 17 wherein outputting the output signal on the output terminal includes:
comparing the potential difference to a predetermined threshold; and
outputting, as the output signal, the first voltage level relative to the reference when the potential difference is lower than the predetermined threshold to indicate that the Serial ATA communications cable connects to the device, and the second voltage level relative to the reference when the potential difference is greater than the predetermined threshold to indicate that the Serial ATA communications cable does not connect to the device, the second voltage level being different than the first voltage level.

19. The Serial ATA communications system of claim 1 wherein the device is a disk drive; and
wherein the output signal indicates an operating status of the disk drive.

20. The host of claim 9 wherein the device is a disk drive; and
wherein the output signal indicates an operating status of the disk drive.

* * * * *